United States Patent Office.

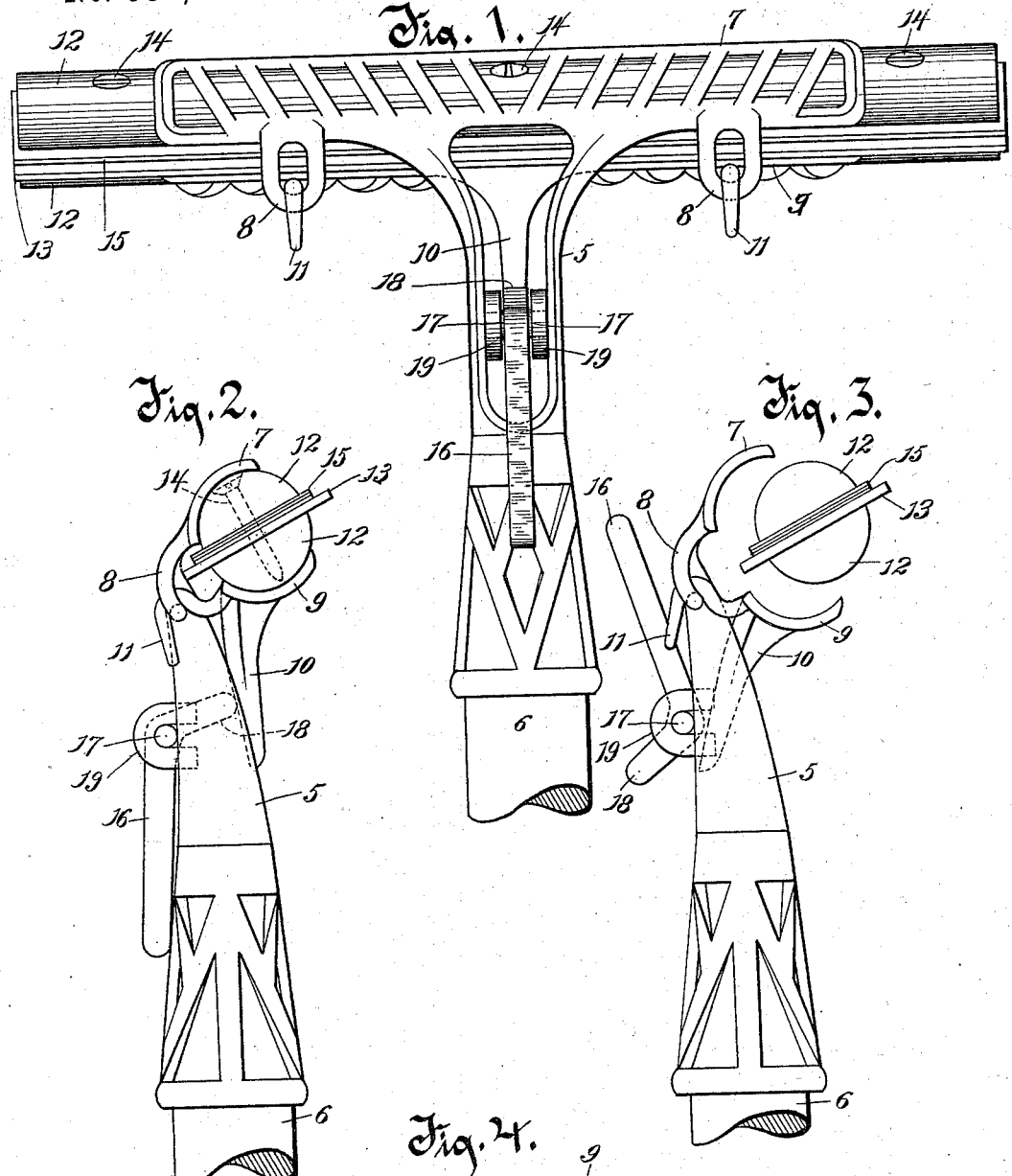

MOSES J. BARRON, OF MILWAUKEE, WISCONSIN, ASSIGNOR OF ONE-HALF TO JACOB J. ILLIAN, OF SAME PLACE.

WINDOW-CLEANER.

SPECIFICATION forming part of Letters Patent No. 559,023, dated April 28, 1896.

Application filed March 25, 1895. Serial No. 543,108. (No model.)

*To all whom it may concern:*

Be it known that I, MOSES J. BARRON, of Milwaukee, in the county of Milwaukee and State of Wisconsin, have invented a new and useful Improvement in Window-Cleaners, of which the following is a description, reference being had to the accompanying drawings, which are a part of this specification.

My invention relates to improvements in the device which is especially adapted for use as a window-cleaner, but may also be used as a mop or floor-cleaner or for analogous puposes.

The object of the invention is to provide an improved construction of clamping-jaws and holder for the rubber scraper or other cleaning device whereby said holder, when the jaws are unclamped, is capable of both an axial and longitudinal adjustment, the former adjustment permitting the cleaning device contained in the holder to reach angles and small spaces which would otherwise be inaccessible for cleaning. The construction further contemplates provision for the reversal of the holder, so that unworn portions of the cleaning device may be presented in working position.

With the above primary objects and others in view the invention consists of the devices and parts or their equivalents, as hereinafter more fully pointed out.

In the accompanying drawings, Figure 1 is an elevation of the complete device, showing the holder as held in one position between the jaws. Fig. 2 is a view at right angles to Fig. 1. Fig. 3 is a similar view to Fig. 2, but showing the jaws as unclamped and the holder ready to be inserted between or removed from the clamping-jaws; and Fig. 4 is a detail view of one of the clamping-jaws.

Like numerals of reference denote like parts throughout the several views.

Referring to the drawings, the numeral 5 indicates a socketed shank, into which, for convenient use, a handle 6 is inserted. The upper end of the shank is formed or provided with a transverse clamping-jaw 7, curved or partly circular in cross-section. The lower edge of this jaw is provided with depending curved loops 8 8. A jaw 9, of substantially the same size and shape as the jaw 7 and having a rigid tang or stem 10, is adapted to co-act with the fixed jaw 7, its opposing face being substantially of the same form as the theretoopposed inner face of said jaw 7. The jaw 9 is detachably hinged to the jaw 7, conveniently by means of integral hooks 11 11, extending from the edge thereof, which hooks enter and engage the loops 8 8.

The two curved clamping-jaws are especially adapted for receiving a scraper-holder. This holder consists of two semicircular parts 12 12, between the flat opposing faces of which is adapted to be inserted the rubber scraper or other cleaning device. In the drawings a rubber scraper 13 is shown, which is held securely in place between the two sections of the holder by means of screws 14. I preferably superimpose upon the rubber scraper an additional layer 15 of a cheaper grade of rubber. It is necessary that the rubber have sufficient thickness to withstand the strain to which it is subjected in cleaning, and by providing this additional layer instead of employing a scraper which is itself of sufficient width considerable expense in cost is saved in the extensive manufacture of the device.

For conveniently locking the holder within the jaws a cam-locking device is provided, which consists of a lever-handle 16, provided with laterally-projecting trunnions 17 17 and a cam-tongue 18. The laterally-projecting trunnions have their bearings in apertured lugs 19 19. The construction and arrangement of these parts is such that when the lever-handle is thrown up in the position shown in Fig. 3 the jaw 9 will by gravity swing away from the jaw 7, so as to unclamp the cleaner-holder. The construction and arrangement also is such that on swinging the lever-handle down against the shank 5, in the manner shown in Figs. 1 and 2, the cam-tongue 18, entering the slotted portion of the shank, will force the tang or stem away from the shank and thus bring the jaw 9 toward the fixed jaw 7 sufficiently to clamp the holder firmly between them. The construction and arrangement is also such that when the lever-handle 16 is thrown down against shank 5 the lever-handle and the cam-tongue 18 are in reverse oblique positions to the axis of the shank, whereby the parts are locked in position.

It is evident by the construction of the holder herein shown, with the clamping-jaws correspondingly shaped, that upon the unclamping of said jaws the holder may be turned to different angles within the limit of its movement and held in the adjusted position, thus providing for retaining the operating edge or part of the cleaner at a proper position to enter a small angle or crevice.

It is obvious that if preferred only one edge of the scraper may project beyond the holder; but the construction shown in the drawings is the preferable one, inasmuch as it admits of the entire reversal of the holder, so that the unworn portion of the cleaner may be presented in working position. When both edges of a rubber scraper or both projecting portions of any other form of cleaning device become worn to such an extent as to render them useless, the two sections of the holder may be readily taken apart by taking out the screws, whereby the old cleaner may be removed and a new one substituted.

Having thus described my invention, what I claim, and desire to secure by Letters Patent, is—

1. The combination, of a shank provided at one end with a transverse fixed jaw, said jaw provided near opposite ends with projecting loops, a second jaw separate from the fixed jaw, said second jaw provided, near opposite ends, with hooks, and between the hooks with a stem or tang, said hooks adapted to engage the loops and form a freely-separable hinge-joint, and said stem or tang projecting in line with the shank, and a lever-handle pivoted to the shank and provided with a cam-tongue, said tongue, when the lever-handle is turned in one direction upon its pivot, adapted to bear against the free end of the stem or tang, and thereby force the hinge-jaw toward the fixed jaw, and, when turned in the opposite direction, adapted to remove the pressure of the cam-tongue against the stem or tang to allow the hinge-jaw to return to its normal position, substantially as described.

2. The combination, of a holder consisting of sections, having outer faces of similar contour throughout, and opposed and similar inner flat faces, a scraper between the opposed inner flat faces of the holder, said scraper having projecting edges, means for securing the sections of the holder and the interposed scraper together, jaws having their opposing faces corresponding in shape to the outer faces of the holder, and adapted to receive said holder therebetween, and means for clamping or unclamping the jaws, the registering faces of said jaws of the holder, adapting the holder, when the jaws are unclamped, to be turned, whereby the scraper may be set at any desired angle, substantially as described.

In testimony whereof I affix my signature in presence of two witnesses.

MOSES J. BARRON.

Witnesses:
ANNA V. FAUST,
ARTHUR L. MORSELL.